Sept. 9, 1952 A. N. GOLDSMITH 2,610,246

COMPOSITE PICTURE TELEVISION

Filed Dec. 30, 1949 2 SHEETS—SHEET 1

INVENTOR
Alfred N. Goldsmith
BY
ATTORNEY

Sept. 9, 1952 A. N. GOLDSMITH 2,610,246

COMPOSITE PICTURE TELEVISION

Filed Dec. 30, 1949 2 SHEETS—SHEET 2

INVENTOR
Alfred N. Goldsmith
BY [signature]
ATTORNEY

Patented Sept. 9, 1952 2,610,246

UNITED STATES PATENT OFFICE 2,610,246

COMPOSITE PICTURE TELEVISION

Alfred N. Goldsmith, New York, N. Y., assignor to Radio Corporation of America, a corporation of Delaware Application December 30, 1949, Serial No. 135,963

2 Claims. (Cl. 178—7.2)

Figure 1A:
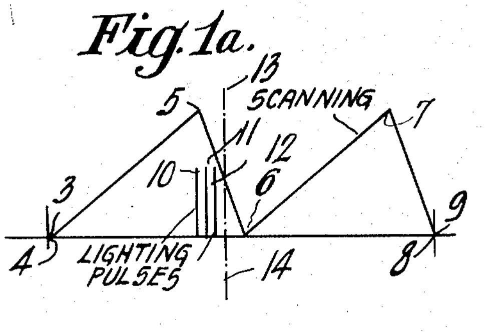

This invention relates to composite picture television systems and methods which involve controlling the illumination of a foreground and a background in a manner to produce a desired pictorial effect. More particularly it relates to methods wherein at least the foreground or the background is illuminated by one or more brief pulses of light of suitably great intensity.

The present invention is applicable to composite picture television systems such as those disclosed by United States Patents 2,073,370 and 2,172,936. These patents disclose systems wherein the illumination of the foreground or middle ground or background portions of the object space is of the conventional and continuous type, such as that produced by incandescent lamps or the like.

However, there are a number of advantages in the use of discontinuous or pulse illumination of one or more of these portions of the object space. Thus pulse illumination (1) can be suitably timed in relation to the television scanning cycle, (2) can be suitably utilized in color television in an efficient fashion by employing successive pulses of light of the corresponding primary color values or pulses of white light, which with minimal color filtering are of correct component-color values, and (3) can be utilized (in conjunction with suitable optical means associated with the camera and functioning in synchronized relation with the pulses of light in the various regions of the object space) to increase the depth of field (commonly termed "depth of focus") of a camera objective lens of given focal length and operating at a specific relative aperture.

Thus it becomes possible to increase the depth of field in television substantially by a method which is described in Patents 2,244,687 and 2,244,688 and in an article appearing in the "Journal of the Society of Motion Picture Engineers" for January 1942 and entitled "An Optical Method for Increasing the Depth of Field." Briefly stated, one embodiment of this method involves scanning the object from front to back by means of a wave of illumination (successive pulses of light) while at the same time following the wave of illumination by a "wave of focusing" of the camera lens.

In the aforesaid article, it is shown that by utilizing intermittent or pulse illumination in correct fashion it becomes possible to photograph a given object space from several different angles, in effect simultaneously, and with increased depth of field for each of the photographs. As will be explained, pulse illumination is applicable to television provided (1) the pickup or camera tube is one having marked light storage capabilities in the sense that it progressively forms an electrical image corresponding to the luminous image applied to its photo-electric electrode and (2) provided that the pulse illumination occurs during the blanking period or return-trace period of the saw-tooth scanning wave. That is, the pulse illumination does not occur during the period when active scanning of the camera-tube image is in process.

It is known that sources of light giving pulses of illumination, with controllable timing of such pulses are now available. These sources are known as "flash tubes." They consist in one practical form of helices of hard glass or quartz containing gaseous xenon or other appropriate gas at appropriate pressure and with suitable conducting electrodes. Such tubes usually operate on voltages of the order of 1,000 to 2,000 volts. They are operated, in one mode of control, by the discharge of an appropriate capacitance through the flash tube and a series-connected thyratron, the conductive periods of which thyratron in turn are suitably timed by grid control potentials applied in a manner well known in the art. Such flash tubes can be operated 50 or 100 times per second if desired, or even more. The duration of each flash lies, in general, between 20 and 200 microseconds. The instantaneous candle power of such tubes is extremely high, being of the order of millions or even hundreds of millions of candle power. The output, in lumen-seconds per flash, is comparable to that of a photoflash bulb. Such flash tubes may be air cooled or otherwise maintained at a suitable operating temperature. The color of the light emitted by such tubes is effectively white. Thus, color pictures may be made by the light of such lamps on daylight Kodachrome film without the use of any color filter and with correct color rendition. These facts are mentioned simply to indicate the practicability and availability of pulse illumination which, in any case, will find wide application in the realms of increased-range and simultaneous-multiple-angle-shot television and motion-picture photography.

To operate flash tubes in a television system, it is necessary that the conditions mentioned above shall be observed (namely, the storage capabilities of the camera tube and the occurrence of the illumination flashes during the scanning blanking period). Such timing of the flashes is readily accomplished by proper association of the timing element (e. g., a thyratron grid control) and the field-frequency generator of the television system.

The invention will be better understood from the following description considered in connection with the accompanying drawings, and its scope is indicated by the appended claims.

Figure 3A:
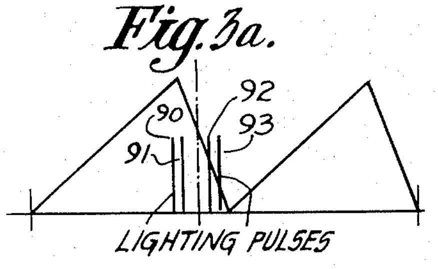
Figure 3B:
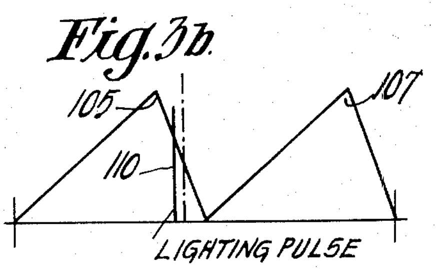
Figure 4A:
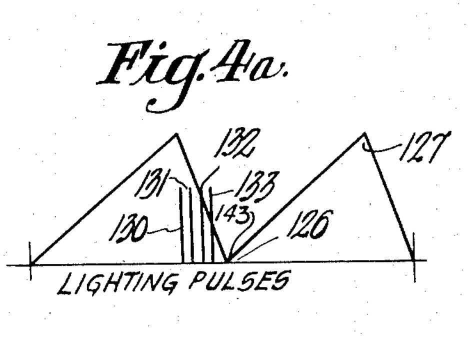
Figure 4B:
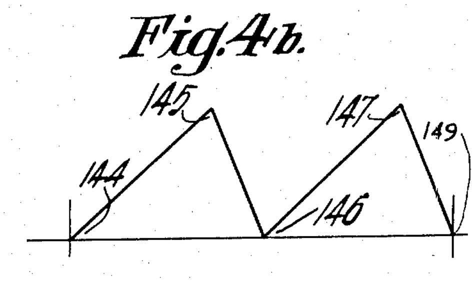
Figure 5:
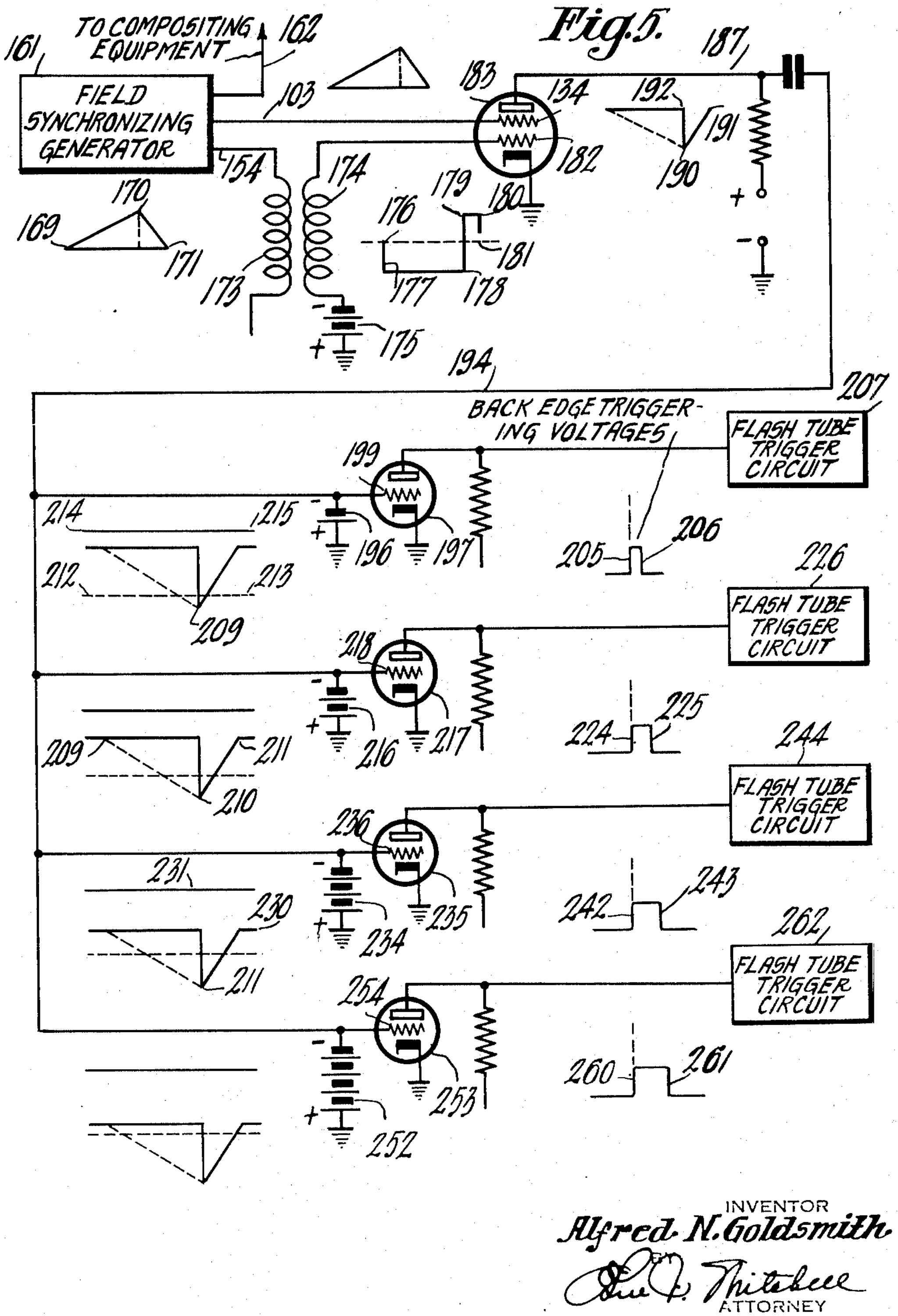

Referring to the drawings:

Figures 1*a* to 4*b* are explanatory diagrams wherein the pulses of illumination of the foreground or background are related to the saw-tooth wave of the field synchronizing generator as indicated by vertical lines, and Figure 5 illustrates a suitable control circuit for the "flash tubes" by which the pulses of illumination are produced.

The foreground, the background, and the television system as a whole are not shown. They may be similar to those shown in Patent 2,073,370 or Patent 2,172,936.

In Figure 1*a*, 3–9 is the scanning or deflection wave for camera 1 which picks up, illustratively, an actual foreground object space with or without live talent or moving objects therein. 10, 11, and 12 are individual pulses of illumination on this foreground region. These pulses may each illuminate the entire set or, alternatively, pulse 10 may illuminate the front of the foreground space, 11 the middle of the foreground space, and 12 the rear of the foreground space. In this latter arrangement it would be natural and appropriate to use the differential-focusing methods which enable increased depth of field to be secured, as referred to in the preceding discussion. It will be noted that all the lighting impulses 10—12 occur prior to the epoch or time indicated by line 13, 14.

The electrical image thus formed and stored on the photo-sensitive mosaic of the camera tube is then scanned during the period 6, 7 and the resulting signal is then used as the "foreground signal" in the electrical-composite process.

Figure 1B:
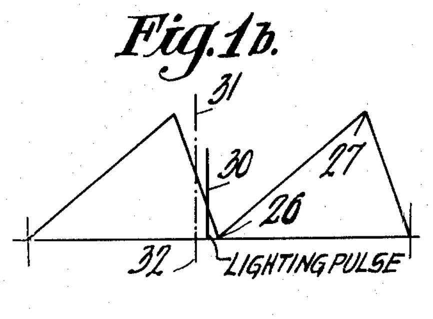

Figure 1*b* similarly illustrates the operation for camera 2, which picks up either a first background space, a lantern slide, a motion-picture film, a card illustration, a kaleidoscopic effect, or the like. That is, camera 2 picks up either a fixed or moving foreground. The subject matter of camera 2 is illuminated by the single lighting pulse 30 which, it will be noted, comes later than the epoch indicated by 31, 32, which epoch is identical with that of 13, 14. The stored image in this case also is scanned during the period 26, 27.

In the event that increased depth of field on a physical background space is desired to be obtained by camera 2, light pulse 30 may be replaced by several sequential light pulses which respectively illuminate, for example, the front portion of the background space, and the rear portion of the background space.

It will thus be noted that the lighting pulses for camera 1 occur prior to the lighting pulses for camera 2. It will also be noted that there is no restriction on whether the background is fixed or moving for Figures 1*a*, 1*b*, 2*a*, 2*b*, 3*a*, and 3*b*.

The otuput signal of camera 1, during the period 6, 7, is used in a manner similar to that disclosed by the aforesaid patents to control by appropriate electronic switching methods the existence or presence of the background signal of camera 2 during the same period 26, 27. The thus added foreground signal and electrically-masked background signal are then combined in a mixer or otherwise and constitute the total electrical-composite signal.

Figure 2A:
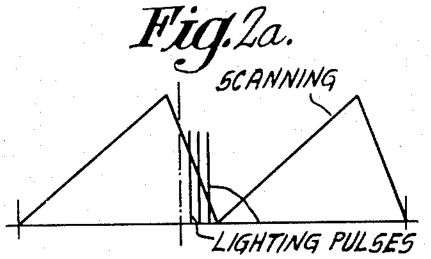
Figure 2B:
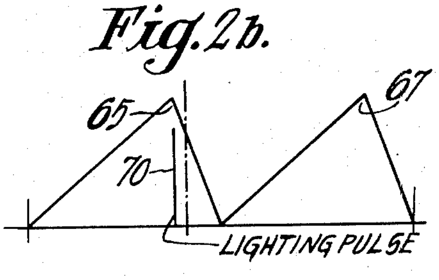

In Figures 2*a* and 2*b* arrangements are shown which are identical in nature with those of Figures 1*a* and 1*b*, except that the lighting pulses for camera 1 now come later than the pulse or pulses for camera 2 (instead of earlier). The figures need not be further described.

In Figures 3*a* and 3*b* entirely similar arrangements are shown except that the light pulse or pulses for camera 2 (110) are interspersed or interwoven with those of camera 1 (90—93).

It should be added that if motion-picture film is used for camera 2, it is necessary that the pulldown in the case of Figure 1*b* shall come approximately in the period between 25 and 31, 32 and that the film shall then remain stationary until time 27 is reached.

In the case of Figure 2*b* the pulldown should occur in the period between 65 and 70, the film being stationary at the time 70 and remaining so until time 67 is reached.

In the case of Figure 3*b* the film pulldown similarly occurs after time 105 and before time 110, after which the film remains stationary until point 107 is reached.

In Figure 4*a*, the foreground is subjected to pulses of light 130—133 and the foreground stored image is scanned during the period 126, 127.

In Figure 4*b*, however (and in contradistinction to the arrangements of Figures 1*b*, 2*b*, and 3*b*), the illumination of the background is continuous. That is, during the entire period between 143 and 149, the background illumination is constant or substantially so. Scanning occurs, according to the usual procedure, during the periods 144, 145, and 146, 147. In view of the nature of the illumination and scanning process of the background in this case, the method is suitable primarily for fixed backgrounds. It is not suitable, as it stands, for motion-picture backgrounds.

It will be noted that in every case one portion of the electrically-produced composite picture (that is, either the foreground, or middle ground, or background) is subjected to pulse illumination. It is also to be noted that this pulse illumination may be either a single pulse, a series of individual pulses without special association with the optical arrangements of the camera, or a series of illumination pulses optically related to the camera-objective focusing in order to produce increased depth of field.

As indicated above, the illumination timing circuits must be so constituted that (1) the timing or flashing of the lamps occurs only during the falling part of the field synchronizing wave, since it is only during this period that the luminous image produced by the lamps should be stored on the photosensitive surface of the camera, and (2) the flashing of the lamps must occur only at specific times, which can be most conveniently related to the instantaneous amplitude of each portion of the falling part of the field synchronizing wave. An illumination timing circuit meeting these requirements is illustrated by Figure 5.

In the illumination timing circuit of Figure 5, the field synchronizing generator 161 feeds any portion of the picture compositing system (such as that described in the aforesaid Patents 2,073,370 and 2,172,936) through a conductor 162. This system is not here described in detail for the reason that (1) it is well known and (2) the present invention pertains more particularly to the application of pulse illumination to the foreground, background, or both the foreground and background of such a system as that disclosed by the patents.

The sawtooth synchronizing wave passes through lead 103 to one control grid 134 of tube 183. However, tube 183 also has a second control grid 182 which is strongly biased negatively by battery 175 in such fashion that normal passage of the synchronizing wave or any portion thereof through tube 183 occurs only when a considerable positive potential is additionally placed on grid 182. Such a positive potential may be derived, for example, as shown in the drawing. A portion of the synchronizing wave passes through conductor 154, through primary 173 of a transformer. This synchronizing wave is shown as 169—170—171. In the secondary circuit 174 there will appear the voltages 176, 177, 178, 179, 180, 181. It is to be noted that the portion 179, 180 is strongly positive and therefore will enable the falling portion of the waves 169, 170, 171 to pass through tube 183. In other words, the actual current or voltage in the circuit 187 will be increased by 192, 190, 191. A portion, therefore, is taken through 194 and placed on the grid 199 of the tube 197, 218 of the tube 217, 236 of the tube 235, and 254 of the tube 253 (assuming that four and only four illumination impulses per field scanning are desired. If more are desired, additional tubes must be provided in this series).

It will be noticed that these tubes are intended, illustratively, to produce progressively delayed impulse controls to start the flashing of individual flash tubes or groups of flash tubes. It will also be noticed that the biases 196, 216, 234, 252 on the grids of these tubes are progressively increasingly negative. This is indicated by the progressively greater distance between the axes such as 214, 215 of these grid control voltage waves and the potentials 212, 213 or the like at which the corresponding tube begins to pass current in its plate circuit. The inverted sawtooth waves applied to the grids of the tubes 197, 217, 235, 253 are shown, e. g., by the reference numerals 209, 210, 211; however, the slowly falling initial portion of such waves is not actually present (as previously stated). The only portion actually present is the portion indicated by such sections as 192, 190, 191.

It will be noticed that the tubes 197, 217, 235, 253 will be blocked concurrently but will begin to pass current at progressively later epochs under such an arrangement. Hence their output voltages will resemble 205, 206, 224, 225, 242, 243 or 260, 261. Only the back edge of these voltage waves will act to trigger the various flash tube trigger circuits and flash tubes indicated by boxes 207, 226, 244, 262. Thus the tubes are flashed at the desired times or epochs. These epochs may be controlled by varying amplitudes of such waves as 192, 190, 191 or by altering the fixed bias voltages 196, 216, 234, 252.

What the invention provides is an improved composite television picture producing system and method of operation wherein the foreground, background, or both the foreground and background portions of an object space are illuminated by pulse illumination and images of these portions are scanned to produce foreground and background image signals which are thereafter combined to produce a composite image signal.

What is claimed is:

1. In a system wherein the foreground and background portions of an object space are separately illuminated and images of said portions are scanned to produce foreground and background signals which are thereafter combined to produce a composite image signal, the combination of means including a field synchronizing generator, means responsive to the output of said generator for producing a control voltage which changes only during the decreasing part of the output wave of said generator, a plurality of electron discharge devices each having its grid biased to a different potential, means for applying said control voltage to the grids of said devices, and means responsive to the outputs of said devices for pulse illuminating at least one of said portions.

2. In a system wherein the foreground and background portions of an object space are separately illuminated and images of said portions are scanned to produce foreground and background signals which are thereafter combined to produce a composite image signal, the combination of means including a field synchronizing generator, a transformer having a primary and a secondary, said primary being connected to the output of said generator, an amplifier having at least two control grids and a plate, one of said grids being connected to the output of said field synchronizing generator, the other of said grids being connected to the secondary of said transformer in such fashion that a control voltage is developed during one portion of the output wave of said generator, a plurality of electron discharge devices each having its grid biased to a different potential, means for applying said control voltage to the grids of said devices, and means responsive to the outputs of said devices for pulse illuminating at least one of said portions.

ALFRED N. GOLDSMITH.

REFERENCES CITED

The following references are of record in the file of this patent:

UNITED STATES PATENTS

| Number | Name | Date |
|---|---|---|
| 2,073,370 | Goldsmith | Sept. 3, 1937 |
| 2,244,688 | Goldsmith | Oct. 6, 1941 |
| 2,303,960 | Seeley | Jan. 12, 1942 |
| 2,343,971 | Goldsmith | Mar. 14, 1944 |
| 2,483,149 | Norgaard | Sept. 27, 1949 |

FOREIGN PATENTS

| Number | Country | Date |
|---|---|---|
| 322,493 | Great Britain | June 12, 1929 |
| 475,091 | Germany | Sept. 4, 1929 |
| 553,197 | Great Britain | May 12, 1943 |